United States Patent
Chuang et al.

(10) Patent No.: US 8,423,094 B2
(45) Date of Patent: Apr. 16, 2013

(54) FEMTOCELL AND CONTROLLING METHOD THEREOF

(75) Inventors: Chih-Fu Chuang, Taipei Hsien (TW); Wen-Ching Hsiao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 393 days.

(21) Appl. No.: 12/916,605

(22) Filed: Oct. 31, 2010

(65) Prior Publication Data

US 2012/0046084 A1    Feb. 23, 2012

(30) Foreign Application Priority Data

Aug. 19, 2010    (CN) .......................... 2010 1 0256020

(51) Int. Cl.
 *H04B 1/38* (2006.01)
 *H04M 1/00* (2006.01)
 *G08C 17/00* (2006.01)

(52) U.S. Cl.
 USPC ......... 455/574; 455/550.1; 455/572; 370/311

(58) Field of Classification Search ................... 455/574, 455/572, 550.1; 370/311
 See application file for complete search history.

(56) References Cited

U.S. PATENT DOCUMENTS

2009/0285143 A1*    11/2009    Kwun et al. .................. 370/311

* cited by examiner

*Primary Examiner* — Melody Mehrpour
*Assistant Examiner* — Natasha Cosme
(74) *Attorney, Agent, or Firm* — Altis Law Group, Inc.

(57) ABSTRACT

A femtocell includes a memory, a transmitter, a receiver and a controller. The memory stores access probability values in different time periods, and a comparison table of power saving rates and probability thresholds. Each power saving rate is a proportion of the time periods whose access probability values are not more than a predetermining probability threshold and all time periods. The controller includes a setting module setting the predetermining probability threshold, a time module getting a current time and a corresponding current time period, a user identifying module determining whether the user accessing the femtocell through the receiver is a registered user, a switching module controlling the transmitter through determining whether the access probability value at the current time period is less than the predetermined probability threshold, a statistic module calculating the access probability value at the current time period according to the identifying result of the user identifying module.

14 Claims, 5 Drawing Sheets

| First week | Monday | Tuesday | Wednesday | Thursday | Friday | Saturday | Sunday |
|---|---|---|---|---|---|---|---|
| 0-4 | 1 | 1 | 1 | 1 | 1 | 1 | 1 |
| 4-8 | 1 | 1 | 1 | 1 | 1 | 1 | 1 |
| 8-12 | 0 | 0 | 0 | 0 | 0 | 1 | 1 |
| 12-16 | 0 | 0 | 0 | 0 | 0 | 1 | 1 |
| 16-20 | 1 | 1 | 1 | 1 | 1 | 1 | 1 |
| 20-24 | 1 | 1 | 1 | 1 | 1 | 1 | 1 |

| Second week | Monday | Tuesday | Wednesday | Thursday | Friday | Saturday | Sunday |
|---|---|---|---|---|---|---|---|
| 0-4 | 1 | 1 | 1 | 1 | 1 | 1 | 1 |
| 4-8 | 1 | 1 | 1 | 1 | 1 | 1 | 1 |
| 8-12 | 0 | 0 | 0 | 0 | 0 | 0 | 1 |
| 12-16 | 0 | 0 | 0 | 0 | 0 | 0 | 1 |
| 16-20 | 1 | 1 | 1 | 1 | 1 | 1 | 1 |
| 20-24 | 1 | 1 | 1 | 1 | 1 | 1 | 1 |

· · ·
· · ·
· · ·

| Eighth week | Monday | Tuesday | Wednesday | Thursday | Friday | Saturday | Sunday |
|---|---|---|---|---|---|---|---|
| 0-4 | 1 | 1 | 1 | 1 | 1 | 1 | 1 |
| 4-8 | 1 | 1 | 1 | 1 | 1 | 1 | 1 |
| 8-12 | 0 | 0 | 0 | 0 | 0 | 1 | 0 |
| 12-16 | 0 | 0 | 0 | 0 | 0 | 1 | 0 |
| 16-20 | 1 | 1 | 1 | 1 | 1 | 1 | 1 |
| 20-24 | 1 | 1 | 1 | 1 | 1 | 1 | 1 |

FIG. 2

|       | Monday | Tuesday | Wednesday | Thursday | Friday | Saturday | Sunday |
|-------|--------|---------|-----------|----------|--------|----------|--------|
| 0-4   | 1      | 1       | 1         | 1        | 1      | 0.875    | 0.875  |
| 4-8   | 1      | 1       | 1         | 1        | 1      | 0.875    | 0.875  |
| 8-12  | 0.125  | 0.125   | 0.125     | 0.125    | 0.125  | 0.25     | 0.25   |
| 12-16 | 0.125  | 0.125   | 0.125     | 0.125    | 0.125  | 0.25     | 0.25   |
| 16-20 | 0.625  | 0.75    | 0.75      | 0.625    | 0.625  | 0.75     | 0.75   |
| 20-24 | 1      | 1       | 1         | 1        | 1      | 0.875    | 0.875  |

FIG. 3

| P0 | 0 | 0 | S0 |
|---|---|---|---|
| P1 | 0.125 | 0.24 | S1 |
| P2 | 0.25 | 0.33 | S2 |
| P3 | 0.375 | 0.33 | S3 |
| P4 | 0.5 | 0.33 | S4 |
| P5 | 0.625 | 0.4 | S5 |
| P6 | 0.75 | 0.5 | S6 |
| P7 | 0.875 | 0.64 | S7 |
| P8 | 1 | 1 | S8 |

FIG. 4

FEMTOCELL AND CONTROLLING METHOD THEREOF

BACKGROUND

1. Technical Field

The present disclosure relates to a femtocell and a femtocell controlling method.

2. Description of Related Art

In the present femtocells always provide a localized cell phone service regardless of whether there are any user equipments around the femtocells or not. However, sometimes there is no user equipment around the femtocells. For example, the femtocell may not need to be accessed during non working hours, when the femtocell is located in an office. The femtocell may not need to be accessed during working hours, when the femtocell is located in a residence. If the femtocell still provides a localized cell phone service when no user equipment exists around the femtocell, the femtocell will do nothing but waste power.

What is needed, therefore, is a new femtocell and a femtocell controlling method to overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

FIG. 2 is an access status records table stored in the femtocell of FIG. 1.

FIG. 3 is a probability record table stored in the femtocell of FIG. 1.

FIG. 4 is a comparison table of power saving rates and probability thresholds stored in the femtocell of FIG. 1.

DETAILED DESCRIPTION

Embodiments of the present disclosure will now be described in detail below, with reference to the accompanying drawings.

Figure 1:
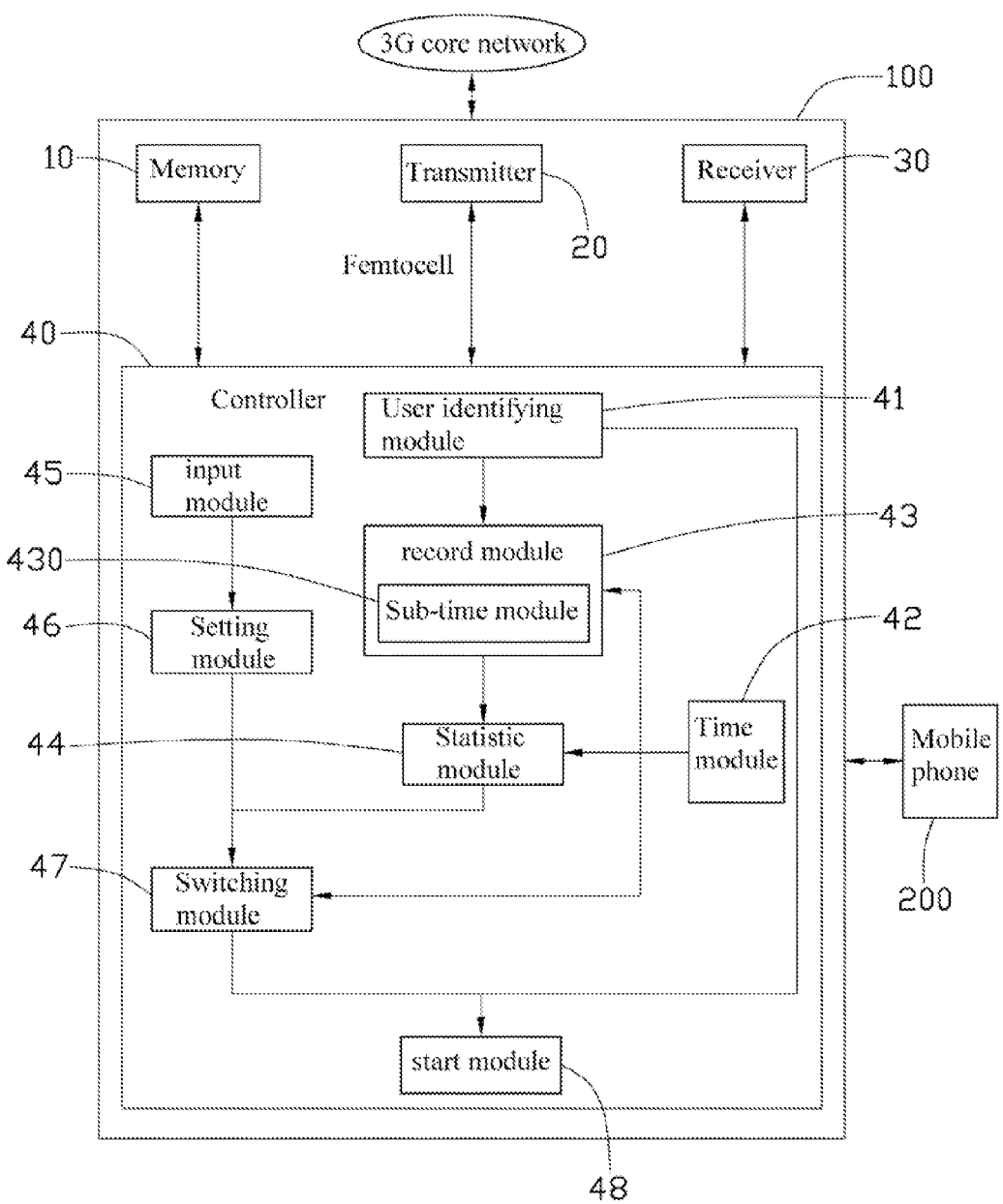
FIG. 1 is a block diagram of a communication network including a femtocell according to an exemplary embodiment.

Referring to FIG. 1, a femtocell 100, according to an exemplary embodiment, is shown. In the present embodiment, the femtocell 100 is a home base station. The femtocell 100 is enabled to connect a mobile phone 200 to a standards-based interface for 3G core network. The femtocell 100 includes a memory 10, a transmitter 20, a receiver 30, and a controller 40. The controller 40 is electrically connected to the memory 10, the transmitter 20, and the receiver 30.

The memory 10 stores a registered user record table for storing the identification of the registered users, a number of access status records tables for storing the access status of the registered users in different time periods. A probability record table for storing access probabilities of the registered users corresponds to the different time periods, and a comparison table of power saving rates and probability thresholds.

In the present embodiment, the identification of the registered user is the international mobile subscriber identity stored in a SIM card. The access status records tables, the probability record table, and the comparison table will be described in detail below.

The transmitter 20 is used for broadcasting signals. The transmitter 20 can utilize one of the standards such as the GSM (Global system for mobile communications), the CDMA (Wideband Code Division Multiple Access), the Wimax (Worldwide Interoperability for Microwave Access), the LTE (Long Term Evolution), and the WLAN (Wireless Local Area Network). In the present embodiment, the transmitter 20 operates, when the femtocell 100 is started for the first time. In other embodiments, the transmitter 20 can be switched off in the beginning. In this case, the transmitter 20 can be started when a registered user accesses the femtocell 100, or the controller 40 can start the transmitter 20 when the access probability of the registered user in a current time is greater than a predetermining probability threshold set by a user.

The receiver 30 receives signals emitted by a user equipment. The standard utilized by the receiver 30 is the same as that of the transmitter 20. The receiver 30 operates at all times.

The controller 40 includes a user identifying module 41, a time module 42, a record module 43, a statistic module 44, an input module 45, a setting module 46, a switching module 47, and a start module 48.

The user identifying module 41 determines whether the femtocell 100 is accessed or not, and further determines whether the user accessing to the femtocell 100 is a registered user or not. In detail, the user identifying module 41 determines whether the receiver 30 receives an access signal or not. If a user accesses the femtocell 100, the user identifying module 44 determines whether the identification of the user has been stored in the registered user record table. In the present embodiment, the user identifying module 41 determines whether the IMSI of the mobile phone 200 is stored in the registered user record table or not. If the IMSI of the mobile phone 200 is stored in the registered user record table, the access user is identified as a registered user, and the user identifying module 41 sends an identifying signal to the record module 43 and the start module 48. If the IMSI of the mobile phone 200 is not stored in the registered user record table, the accessing user is identified as an unregistered user.

The time module 42 gets a current time and determines a time period corresponding to the current time. In detail, the time module 42 gets the current system time set from the femtocell 100. The time module 42 compares the current time to each time period stored in the access status records table to find a time period corresponding to the current time as the current time period.

The record module 43 modifies the access status records tables based on the identifying signal from the user identifying module 41 and the time period found by the time module 42. Referring to FIG. 2, each access status records table is an i×j matrix with a number of status parameters $a_{ij}$. Each status parameter $a_{ij}$ matches a time period $T_{ij}$. The number i and the number j are natural numbers. The initial value of the status parameter $a_{ij}$ is 0. If the record module 43 receives the identifying signal from the user identifying module 41, the record module 43 changes the value of status parameter $a_{ij}$ to 1 at the current time period based on the time period found by the time module 42.

In the present embodiment, the record module 43 further includes a sub-time module 430. The sub-time module 430 determines whether the current time is the end of the current time period. If the record module 43 does not receive the identifying signal till the end of the current time period, the record module 43 will set the value of the status parameter $a_{ij}$ to 0. In detail, the sub-time module 430 obtains the current time period from the time module 42 and the current time from the system time of the femtocell 100. The sub-time module 430 compares the current time period and the current system time to determine whether the current system time is the end of the current time period.

In the present embodiment, the memory 10 stores eight access status records tables to denote eight weeks. Each access status records table is a 6×7 matrix. The value of the number i is 6, and that of the number j is 7. The number 7 denotes seven days of a week. The number 6 denotes six average time periods within 24 hours of a day. The duration of the time period is optimally a multiple of the period of the periodic location update timer of the mobile phone 200.

The statistic module 44 calculates the access probability of the registered user accessing the femtocell 100 of the current time period, and stores the access probability in the probability record table. Referring to FIG. 3, in the present embodiment, the structure of the probability record table is the same as that of the access status records table. The probability record table is an i×j matrix with a number of access probability values $F_{ij}$. Each access probability value $F_{ij}$ is calculated by a formula, which is m/n. The number m is a sum of the status parameter $a_{ij}$ of all access status records tables at the corresponding time period $T_{ij}$. The number n is the number of the access status records tables. In the present embodiment, the number n is eight. The access probability values $F_{ij}$ denotes the probability of the registered user accessing the femtocell 100 at each time period during the eight weeks. The statistic module 44 calculates an updated access probability value $F_{ij}$ utilizing the formula m/n at each time period. When the record module 43 changes the access status records tables, the statistic module 44 will update the access probability value $F_{ij}$ at the time period found by the time module 42. The probability record table will reflect the user habit that the user accesses the femtocell 100 by continuously modifying the access probability value $F_{ij}$ at each time period.

The input module 45 is used for receiving an input power saving rate h which satisfies the conditional expression 0%=<h=<100%. The power saving rate h is a proportion of the time period that the femtocell 100 operates in the power saving status and all operate time periods. The power saving rate h can be set by a user or by a manufacturer. In the present embodiment, the power saving rate h is 50% set by a user.

The setting module 46 selects the predetermining probability threshold stored in the comparison table according to the power saving rate h. When the access probability of the registered user in a current time is smaller than the predetermining probability threshold, the femtocell 100 will switch to the power saving status.

Referring to FIG. 4, the comparison table stores n+1 probability thresholds $P_k$ and n+1 power saving rates $S_k$ corresponding to the probability thresholds $P_k$. The probability thresholds $P_k$ is equal to k/n. The number k is an integer selected from 0 to n. The power saving rate $S_k$ is equal to c/n. The c is the number of the access probability values $F_{ij}$ stored in the probability record table less than a predetermining probability threshold $P_k$. The power saving rate $S_k$ is a proportion of the time periods whose access probability values are less than or equal to the predetermining probability threshold $P_k$ and all time periods. In the present embodiment, the comparison table includes nine probability thresholds $P_0$-$P_8$ and nine corresponding power saving rates $S_0$-$S_8$. The setting module 46 determines which power saving rate $S_k$ is greater than or equal to the power saving rate h in an order of $S_0$ to $S_k$, selecting the first one qualified $S_k$, and selecting a probability threshold $P_k$ corresponding to the selected $S_k$ as a predetermining probability threshold. In the present embodiment, the power saving rate $S_6$ is the first one which greater than or equal to 50% in an order of $S_0$ to $S_8$. The setting module 46 selects the predetermining probability threshold $P_6$ corresponding to the power saving rate $S_6$. The value of the predetermining probability threshold $P_6$ is 0.75. In other embodiments, the setting module 46 can also select a power saving rate $S_k$ which is nearest to the power saving rate h as the selected power saving rate $S_k$ and thus select a corresponding predetermining probability threshold $P_k$.

The switching module 47 compares an access probability value $F_{ij}$ at the current time period with the predetermining probability threshold $P_k$ selected by the setting module 46. If the access probability value $F_{ij}$ is less than the predetermining probability threshold $P_k$, the switching module 47 will send a switch-off signal to the transmitter 20. Otherwise, the switching module 47 will send a first start signal to the transmitter 20. In the present embodiment, the switching module 47 obtains the time period found by the time module 42 and compares the access probability value $F_{ij}$ with the predetermining probability threshold $P_k$. For example, when the time period found by the time module 42 is at between eight o'clock am and four o'clock pm stored in the probability record table, the switching module 47 sends the switch-off signal to the transmitter 20, because the access probability value $F_{ij}$ is less than the predetermining probability threshold $P_6$ at the above time period. That will reduce power consumption compared to a conventional femtocell. When the time period found by the time module 42 is at other time periods stored in the probability record table, the switching module 47 sends the first start signal to the transmitter 20, because the access probability value $F_{ij}$ is more than the probability threshold $P_6$ at that time period. That will make the femtocell 100 work normally.

The start module 48 sends a second start signal to the transmitter 20, when the registered user accesses the femtocell 100. In the present embodiment, the start module 48 sends the second start signal to the transmitter 20, when the start module 48 receives the identifying signal from the user identifying module 41. Even through the femtocell 100 is in power saving mode, the start module 48 can still start the femtocell 100 to ensure that the user can use the femtocell 100.

Figure 5:
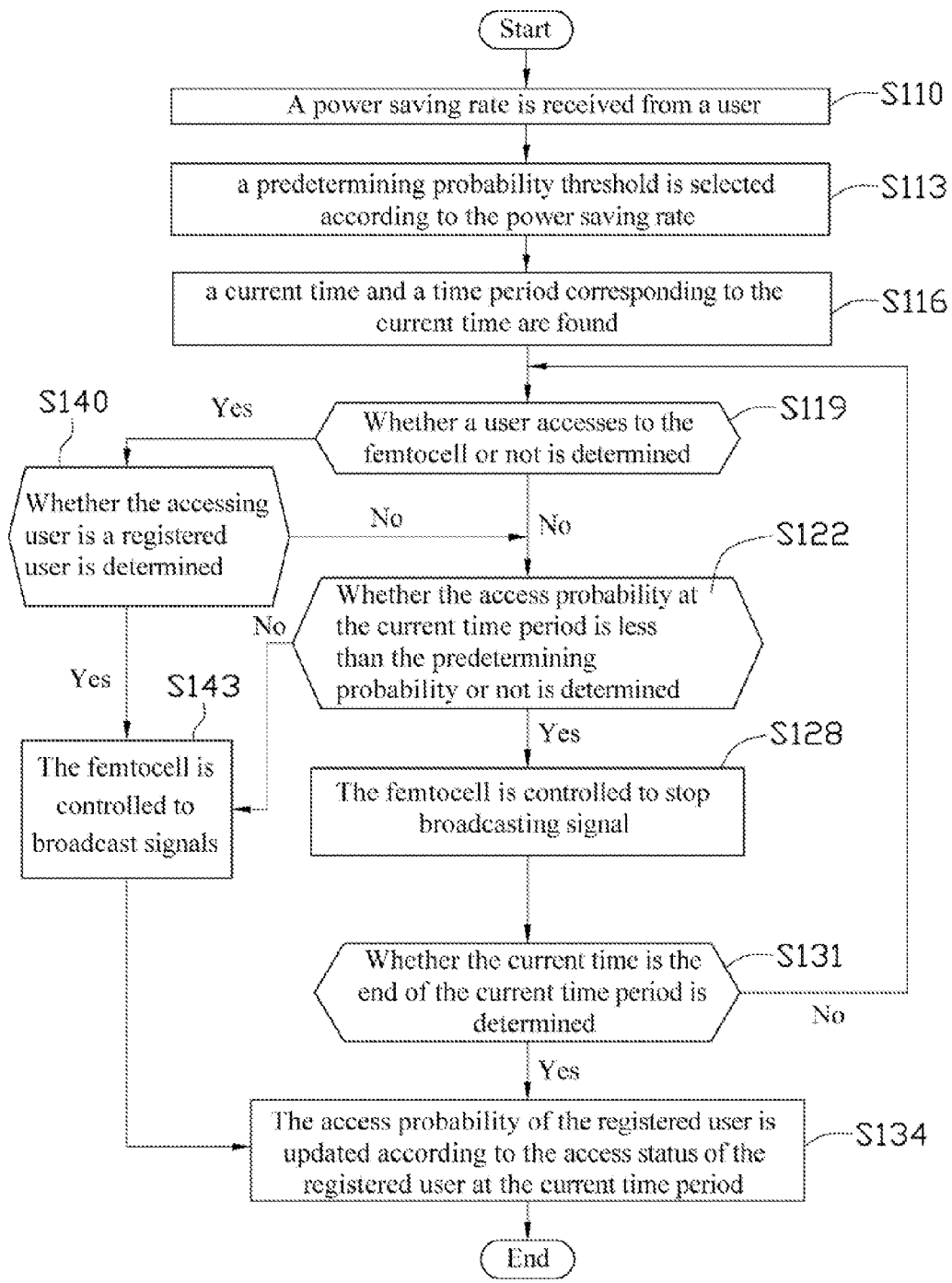
FIG. 5 is a flowchart of a controlling method for the femtocell of FIG. 1.

Referring to FIG. 5, a controlling method of the femtocell 100 includes the following steps.

In step S110, a power saving rate is received from a user. In the present embodiment, the user sets the power saving rate h to 50% by the setting module 41.

In step S113, a predetermining probability threshold is selected according to the power saving rate. In the present embodiment, the setting module 46 determines which power saving rate $S_k$ is greater than or equal to the power saving rate h in the order of S0 to $S_k$, selecting the first one qualified $S_k$, and selecting a probability threshold $P_k$ corresponding to the selected $S_k$ as the predetermining probability threshold. In other embodiments, the setting module 46 can select a probability threshold $P_k$ corresponding to a power saving rate $S_k$ which is nearest to the power saving rate h as the selected power saving rate $S_k$ and thus select a corresponding probability threshold $P_k$. If the power saving rate h has been set before, the steps S110 and S113 can also be omitted.

In step S116, a current time and a time period corresponding to the current time are found. In the present embodiment, the time module 42 gets the current time from the current system time set in the femtocell 100, and compares the current time to each time period stored in the access status records tables to find the time period corresponding to the current time as the current time period.

In step S119, whether a user accesses to the femtocell or not is determined. In the present embodiment, the user identifying module 41 determines whether the receiver 30 receives an access signal or not. If the receiver 30 receives an access signal, then the femtocell 100 performs step S140. If the receiver 30 does not receive an access signal, then the femtocell 100 performs step S122.

In step S122, whether the access probability at the current time period is less than the predetermining probability threshold or not is determined. In the present embodiment, the switching module 47 determines whether the access probability value $F_{ij}$ at the current time period is less than the predetermining probability threshold P6 selected by the setting module 46 or not. If the access probability value $F_{ij}$ at the current time period is less than the predetermining probability threshold P6, then the femtocell 100 performs step S128. If the access probability value $F_{ij}$ at the current time period is greater than or equal to the predetermining probability threshold P6, then the femtocell 100 performs step S143.

In step S128, the femtocell 100 is controlled to stop broadcasting signals. In the present embodiment, if the access probability value $F_{ij}$ is less than the predetermining probability threshold $P_k$ at the current time period, the switching module 47 sends a switch-off signal to the transmitter 20 to switch off the transmitter 20.

In step S131, whether the current time is the end of the current time period is determined. In the present embodiment, the sub-time module 430 determines whether the current time is the end of the current time period. If the current time is the end of the current time period, then the femtocell 100 performs step S134. If the current time is not the end of the current time period, then the femtocell 100 performs step S119.

In step S140, whether the accessing user is a registered user is determined. In the present embodiment, the user identifying module 41 determines whether the identification of the user has been stored in the registered user record table in the memory 10. If the identification of the accessing user has been stored in the registered user record table, then the femtocell 100 performs step S143. If the identification of the accessing user has not been stored in the registered user record table, then the femtocell 100 performs step S122.

In step S143, the femtocell 100 is controlled to broadcast signals. In the present embodiment, if the identification of the user has been stored in the registered user record table, the user identifying module 41 sends the identifying signal to the record module 43 and the start module 48. The start module 48 sends the second start signal to the transmitter 20. In addition, if the access probability at the time period is greater than the predetermining probability threshold, the switching module 47 sends the first start signal to the transmitter 20 to start the transmitter 20.

In step S134, the access probability of the registered user is updated according to the access status of the registered user at the current time period. In the present embodiment, if the record module 43 receives the identifying signal from the user identifying module 41, the record module 43 changes the value of status parameter $a_{ij}$ to 1. If the record module 43 does not receive the identifying signal till the current time is at the end of the time period, the record module 43 will change the value of the status parameter $a_{ij}$ to 0. The statistic module 44 calculates an updated access probability value $F_{ij}$ utilizing the formula m/n at each time period and updates the probability record table.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A femtocell comprising:
a memory configured for storing the identification of at least one registered user, a plurality of access probability values in different time periods, and a comparison table of power saving rates and probability thresholds corresponding to the power saving rates, wherein each access probability value represents a probability that the femtocell is accessed by a registered user in one of the time periods, each power saving rate is a proportion of the time periods whose access probability values are less than or equal to a predetermining probability threshold and all time periods;
a transmitter;
a receiver; and
a controller connected to the memory, the transmitter, and the receiver, the controller comprising:
 a setting module configured for selecting the predetermining probability threshold from the comparison table according to an inputted power saving rate;
 a time module configured for getting a current time and determining a current time period corresponding to the current time;
 a user identifying module configured for determining whether or not the user accessing to the femtocell through the receiver is a registered user stored in the memory;
 a switching module configured for sending a switch-off signal to the transmitter upon the condition that the access probability value at the current time period is less than the predetermined probability threshold, or sending a first start signal to the transmitter upon the condition that the access probability value at the current time period is greater than or equal to the predetermined probability threshold; and
 a statistic module configured for calculating the access probability value at the current time period according to the identifying result of the user identifying module and the current time period determined by the time module.

2. The femtocell as claimed in claim 1, wherein the memory is configured for storing a registered user record table storing the identification of the at least one registered user, a plurality of access status records tables, and a probability record table, each access status records table is an i×j matrix with a plurality of status parameters, each status parameter matches a time period, if the femtocell is not accessed by a registered user, the status parameter is 1, otherwise the status parameter is 0, the initial value of the status parameter is 0, the probability record table is an i×j matrix with the access probability values, the statistic module calculates the access probability values by the formula which is m/n, the m is a sum of the status parameters of all access status records tables at a time period, the n is the number of the access status records tables.

3. The femtocell as claimed in claim 2, wherein the comparison table comprises n+1 probability thresholds $P_k$ and power saving rates $S_k$ corresponding to the probability thresholds $P_k$, the probability thresholds $P_k$ are calculated by the formula k/n, the number k is an integer selected from 0 to n, the power saving rates $S_k$ are calculated by the formula c/n, the c is the number of the access probability values stored in the probability record table less than the predetermining probability threshold, the setting module is configured for determining which power saving rate is greater than or equal to the inputted power saving rate in an order of $S_0$ to $S_k$, selecting the first qualified power saving rate $S_k$, and selecting a probability threshold $P_k$ corresponding to the selected power saving rate $S_k$ as the predetermined probability threshold.

4. The femtocell as claimed in claim 3, wherein the controller further comprises an input module configure for receiving the inputted power saving rate, and a record module, the user identifying module is configured for sending an identifying signal to the record module if the user accessing to the femtocell through the receiver is a registered user, the record module is configure for setting the value of the status parameter to 1 corresponding to the time period that the registered user accesses the femtocell if receiving the identifying signal, and setting the value of the status parameter to 0 if not receiving the identifying signal.

5. The femtocell as claimed in claim 4, wherein the controller further comprises a start module, the start module is configured for sending a second start signal to the transmitter when the start module obtains the identifying signal from the user identifying module.

6. The femtocell as claimed in claim 4, wherein the record module further comprises a sub-time module which is configured for determining whether the current time is the end of the current time period, if the record module does not receive the identifying signal till the end of the current time period, the record module will set the value of the status parameter to 0.

7. The femtocell as claimed in claim 1, wherein the standard of the transmitter is selected from the group consisting of the Global system for mobile communications, the Wideband Code Division Multiple Access, the Worldwide Interoperability for Microwave Access, the Long Term Evolution, and the Wireless Local Area Network.

8. The femtocell as claimed in claim 1, wherein the identification of the at least one registered user is the international mobile subscriber identity stored in a SIM card of a mobile phones.

9. A method of controlling a femtocell, the femtocell storing the identification of at least one registered user, a plurality of access probability values of the at least one registered user in different time periods, and a comparison table of power saving rates and probability thresholds corresponding to the power saving rates, each power saving rate being a proportion of the time periods whose access probability values are less than or equal to a predetermining probability threshold and all time periods, the method comprising:
receiving an inputted power saving rate;
selecting a predetermined probability threshold from the comparison table according to the inputted power saving rate;
getting a current time and determining a current time period corresponding to the current time;
determining whether a user accesses the femtocell;
determining whether the access probability value at the current time period is less than the predetermined probability threshold if the user does not access the femtocell; and
stopping broadcasting signals if the access probability value at the time period is less than the predetermined probability threshold.

10. The method as claimed in claim 9, further comprising determining whether the user is a registered user if determining the user accesses the femtocell.

11. The method as claimed in claim 10, further comprising broadcasting the signals if determining the user is a registered user.

12. The method as claimed in claim 10, further comprising updating the access probability value according to the access status of the user at the current time period if determining the user is a registered user.

13. The method as claimed in claim 9, further comprising broadcasting the signal if the access probability value at the current time period is greater or equal to the predetermined probability threshold.

14. The method as claimed in claim 9, further comprising:
determining whether the current time is the end of the current time period after stopping broadcasting the signals; and
updating the access probability value according to the access status of the user at the current time period.

* * * * *